(12) United States Patent
Yanagihara et al.

(10) Patent No.: US 7,342,880 B2
(45) Date of Patent: Mar. 11, 2008

(54) VIDEO INFORMATION TRANSMISSION SYSTEM, AND APPARATUS AND PROGRAM USED FOR VIDEO INFORMATION TRANSMISSION SYSTEM

(75) Inventors: Hiromasa Yanagihara, Saitama (JP); Akio Yoneyama, Saitama (JP); Yasuyuki Nakajima, Saitama (JP)

(73) Assignee: KDDI Corporation, Tokyo (JP)

( * ) Notice: Subject to any disclaimer, the term of this patent is extended or adjusted under 35 U.S.C. 154(b) by 1159 days.

(21) Appl. No.: 10/351,303

(22) Filed: Jan. 27, 2003

(65) Prior Publication Data

US 2003/0152032 A1     Aug. 14, 2003

(30) Foreign Application Priority Data

Feb. 14, 2002   (JP)   ............... 2002-036710

(51) Int. Cl.
*G01R 31/08*   (2006.01)
(52) U.S. Cl. .............. 370/232; 348/192; 370/236
(58) Field of Classification Search ............ None
See application file for complete search history.

(56) References Cited

U.S. PATENT DOCUMENTS

| | | | | |
|---|---|---|---|---|
| 5,768,527 A | * | 6/1998 | Zhu et al. ............ | 709/231 |
| 2002/0136164 A1 | * | 9/2002 | Fukuda et al. ........ | 370/230 |
| 2003/0152106 A1 | * | 8/2003 | Burmeister et al. .... | 370/468 |

FOREIGN PATENT DOCUMENTS

| | | |
|---|---|---|
| EP | 0 669 587 A2 | 8/1995 |
| EP | 1 168 732 A1 | 1/2002 |
| EP | 1 202 487 A2 | 5/2002 |
| JP | 2000-295597 | 10/2000 |
| JP | 2001-230809 | 8/2001 |
| JP | 2001-320440 | 11/2001 |
| JP | 2002-204278 | 7/2002 |
| JP | 2003-169090 | 6/2003 |
| WO | WO 01/22364 A2 | 3/2001 |
| WO | WO 02/49342 A1 | 6/2002 |

OTHER PUBLICATIONS

Japanese Office Action No. 2002-036710 dated Sep. 27, 2006.
Jean-Chrysostome Bolot et al.: "Scalable Feedback Control for Multicast Video Distribution in the Internet" Computer Communication Review, vol. 24, No. 4, Oct. 1994; pp. 58-67.

(Continued)

*Primary Examiner*—Doris H. To
*Assistant Examiner*—Christopher Grey
(74) *Attorney, Agent, or Firm*—Westerman, Hattori, Daniels & Adrian, LLP.

(57) ABSTRACT

This invention provides a video information transmission apparatus for efficiently transmitting a digital video such as MPEG video at real time while controlling congestion on a QoS non-guaranteed IP network and suppressing degradation of a video quality. A transmission control section 13 on a sender side outputs bit rate feedback information in accordance with congestion information on the network to a real-time encoder 12, and controls a transmission bit rate to change the transmission bit rate in accordance with congestion information on the network. The bit rate feedback information is obtained based on the congestion information on the network on the sender side, or obtained on a receiver side and fed back.

24 Claims, 11 Drawing Sheets

OTHER PUBLICATIONS

Hemant Kanakia et al.: "An Adaptive Congestion Control Scheme for Real-Time Packet Video Transport" Computer Communication Review, vol. 23, No. 4, Oct. 1993; 13 pages.

Ingo Busse et al.: "Dynamic QoS Control of Multimedia Applications Based on RTP" on-line http://www.fokus.gmd.de/step.acontrol/ac.html.

Koichi Yano et al.: A Rate Control for Real-time Transmission of Continuous Media Based on Queue Length Estimation From End-to-End Delay, The Institute of Electronics, Information and Communication Engineers, Technical Report of IEICE, vol. 98, No. 9, Apr. 23, 1998, pp. 85-90.

Schulzrinne, H. et al.; "RFC 1889: RTP: A Transport Protocol for Real-Time Applications", Network Working Group Request for Comments, Jan. 1996, pp. 1-38.

Joe I: "Packet Loss and Jitter Control for Real-Time MPEG Video Communications", Computer Communications, Elsevier Science Publishers BV, Amsterdam, NL, vol. 19, No. 11.

* cited by examiner

● HEADER
VERSION(V) :         2 bits
PADDING BIT(P) :     1 bits
EXTENSION(X) :       1 bits
CSRC Count(CC) :     3 bits
MARKER(M) :          1 bits
PAYLOAD TYPE(PT) :   7 bits
SEQUENCE NUMBER :   16 bits
TIME STAMP :        32 bits
SSRC :              32 bits
CSRC :              32 bits

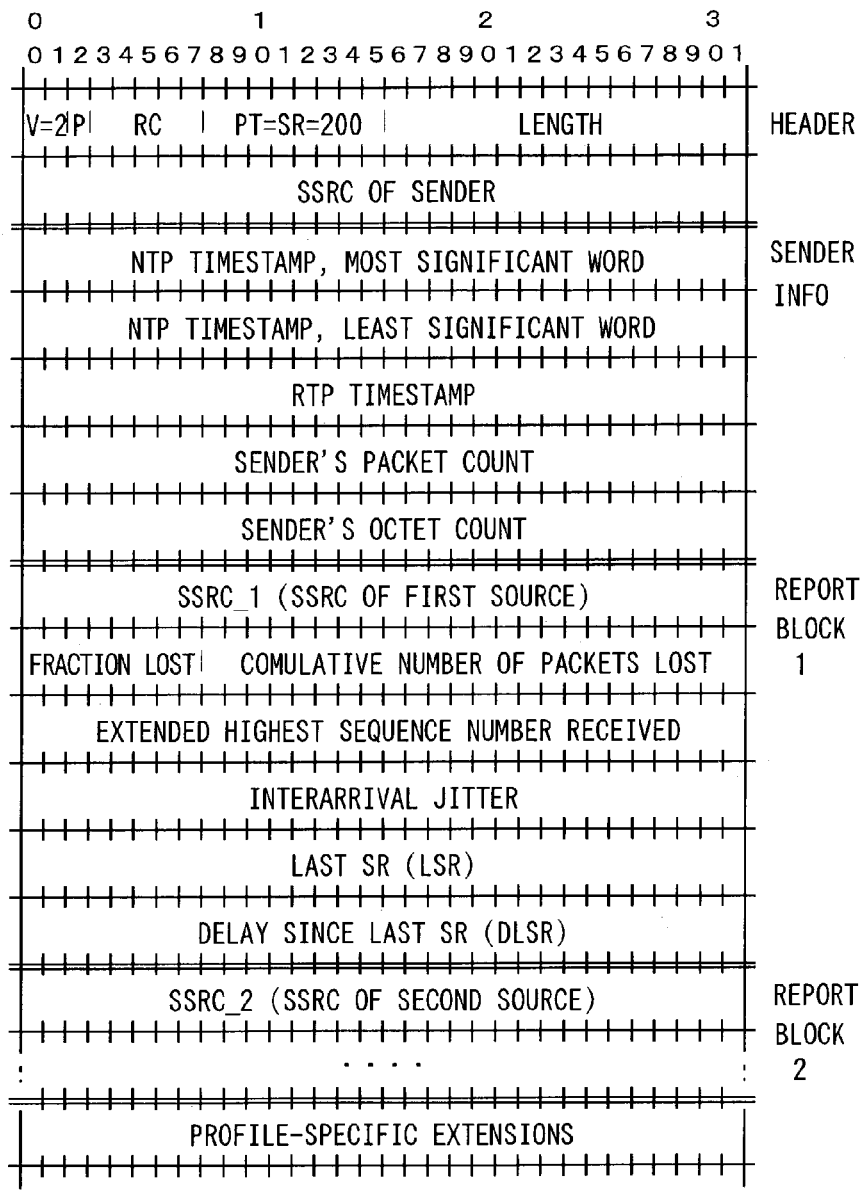

Fig. 5

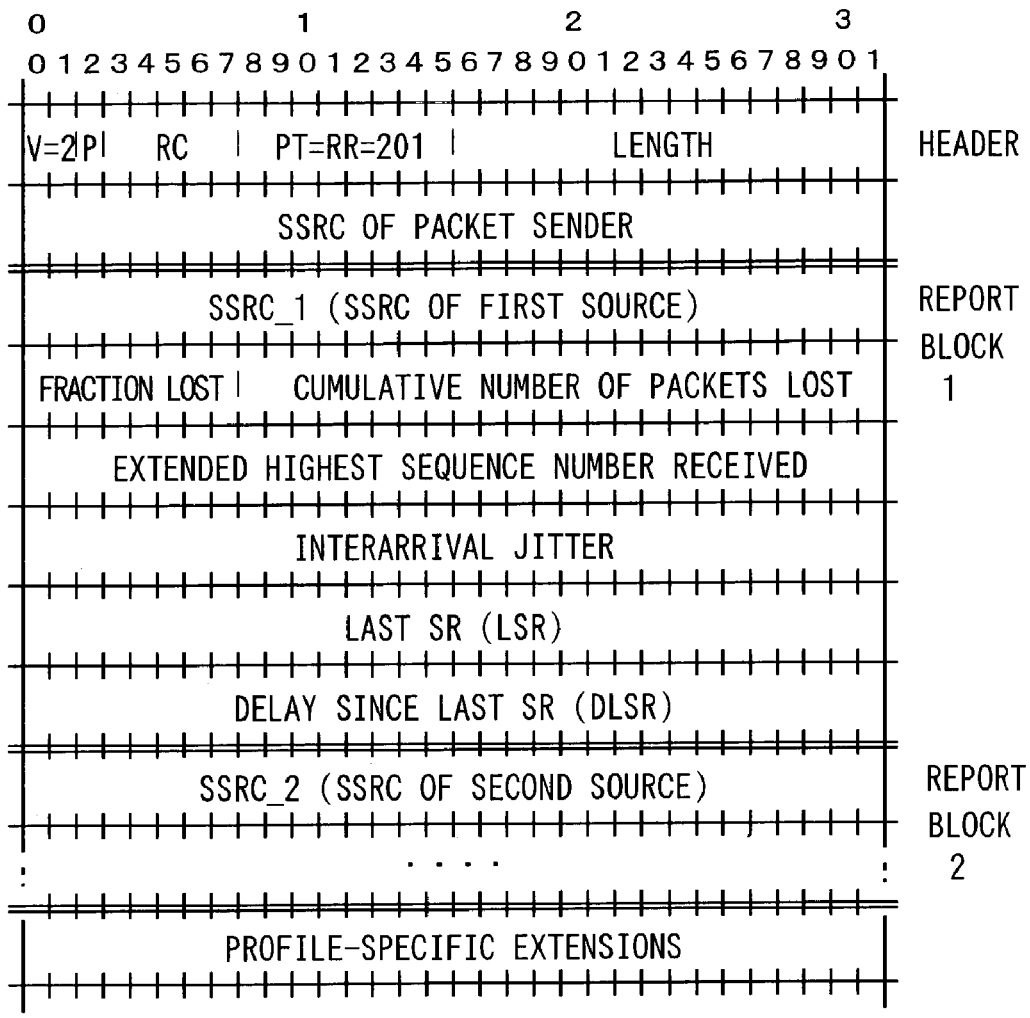

● HEADER
VERSION(V) :                     2 bits
PADDING BIT(P) :                 1 bits
RECEPTION PORT COUNT(RC) :       5 bits
PACKET TYPE(PT) :                8 bits
LENGTH :                        16 bits
SSRC :                          32 bits
● REPORT BLOCK (TRANSMITTED BY AS MUCH AS NUMBER OF SENDERS)
SSRC_n(SOURCE IDENTIFIER) :                      32 bits
FRACTION LOST :                                   8 bits
CUMULATIVE NUMBER OF PACKETS LOST :              24 bits
EXTENDED HIGHEST SEQUENCE NUMBER RECEIVED :      32 bits
INTERARRIVAL JITTER :                            32 bits
LAST SR TIMESTAMP(LSR) :                         32 bits
DELAY SINCE LAST SR(DLSR) :                      32 bits

Fig. 8 rate : TRANSMISSION BIT RATE
rate_cong : TRANSMISSION BIT RATE WHEN PREVIOUS CONGESTION OCCURRED
fraction_lost : NUMBER OF PACKETS LOST BETWEEN PREVIOUS RR AND PRESENT RR
fraction_packets : DIFFERENCE IN SEQUENCE NUMBER BETWEEN PREVIOUS RR AND
    PRESENT RR (NUMBER OF RECEIVED RTP PACKETS)
$\Delta$LossRate : PACKET LOSS RATE (fraction_lost/fraction_packets)
keep_count : NUMBER OF TIMES OF CONTROL SINCE STATE OF CASE 1 UNTIL INCREASE
    OF TRANSMISSION RATE, RATE RESONANCE IS PREVENTED BY IMPARTING
    HYSTERESIS CHARACTERISTIC
State_cong : ASSIGN 1 IF CONGESTION OCCURRED IN PREVIOUS CONTROL, ASSIGN 0
    OTHERWISE
Rate_min, rate_max : MINIMUM AND MAXIMUM OF SETTABLE TRANSMISSION BIT RATE
Jn : JITTERS UNTIL nth CONTROL
$\alpha$(ALPHA), $\beta$(BETA), $\varepsilon$, $\delta$(DELTA) : THRESHOLDS FOR DETECTING START AND END
    OF CONGESTION
    $\alpha$, $\beta$ : JITTER DIFFERENCE THRESHOLD
    $\varepsilon$, $\delta$ : PACKET LOSS RATE THRESHOLD
VALUE APPLIED AS INITIAL VALUE OF KEEP_COUNT WHEN N=CASE 1
B, b, A : VALUES USED TO CHANGE BIT RATE
    B, A : MULTIPLY BIT RATE BY 1/B OR 1/A WHEN DECREASING BIT RATE
    b   : MULTIPLY BIT RATE BY b WHEN DECREASING BIT RATE
MAGNITUDE OF SET VALUES : $B \geq b > A > 1.0$
EXAMPLE OF PARAMETER SETTING : B=1.5, b=1.5, A=1.1
    $\alpha$ =10[ms], $\beta$ =[ms], $\varepsilon$ =10[%], $\delta$ =3[%], N=20

Fig. 11

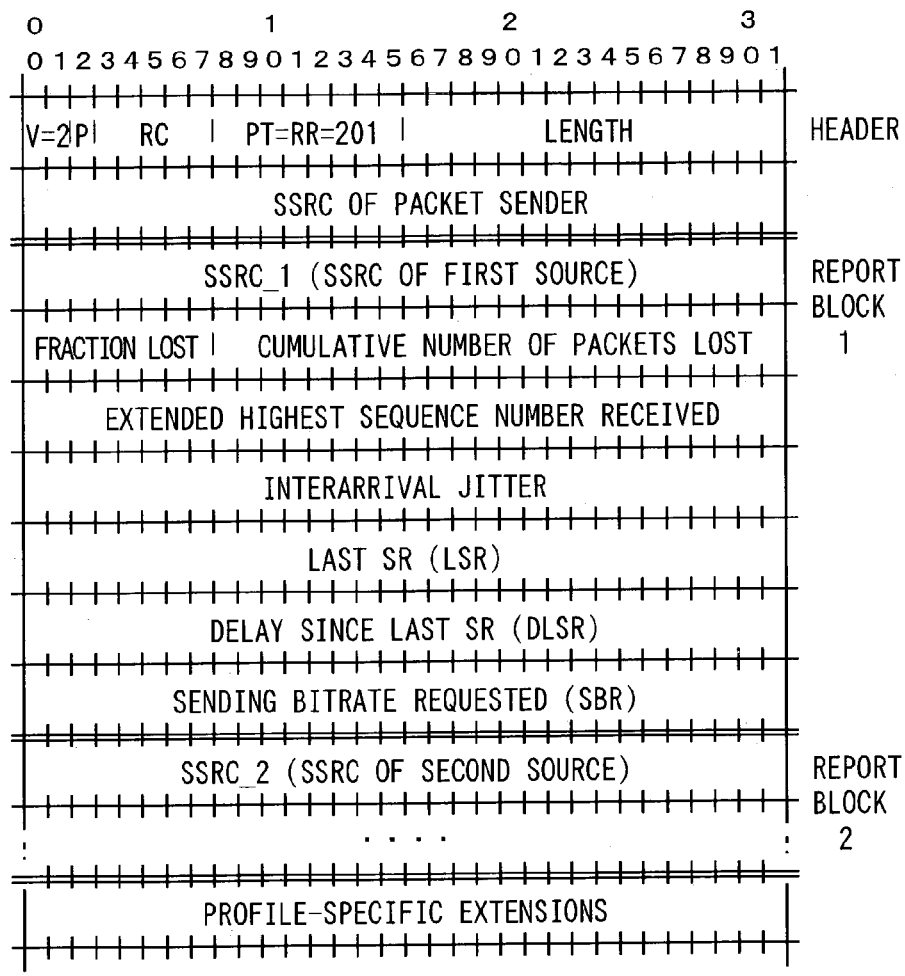

● HEADER
VERSION(V) :                 2 bits
PADDING BIT(P) :             1 bits
RECEPTION PORT COUNT(RC) :   5 bits
PACKET TYPE(PT) :            8 bits
LENGTH :                     16 bits
SSRC :                       32 bits ● REPORT BLOCK (TRANSMITTED BY AS MUCH AS NUMBER OF SENDERS)
SSRC_n(SOURCE IDENTIFIER) :                 32 bits
FRACTION LOST :                             8 bits
CUMULATIVE NUMBER OF PACKETS LOST :         24 bits
EXTENDED HIGHEST SEQUENCE NUMBER RECEIVED : 32 bits
INTERARRIVAL JITTER :                       32 bits
LAST SR TIMESTAMP(LSR) :                    32 bits
DELAY SINCE LAST SR(DLSR) :                 32 bits
SENDING BITRATE REQUESTED(SBR) :            32 bits

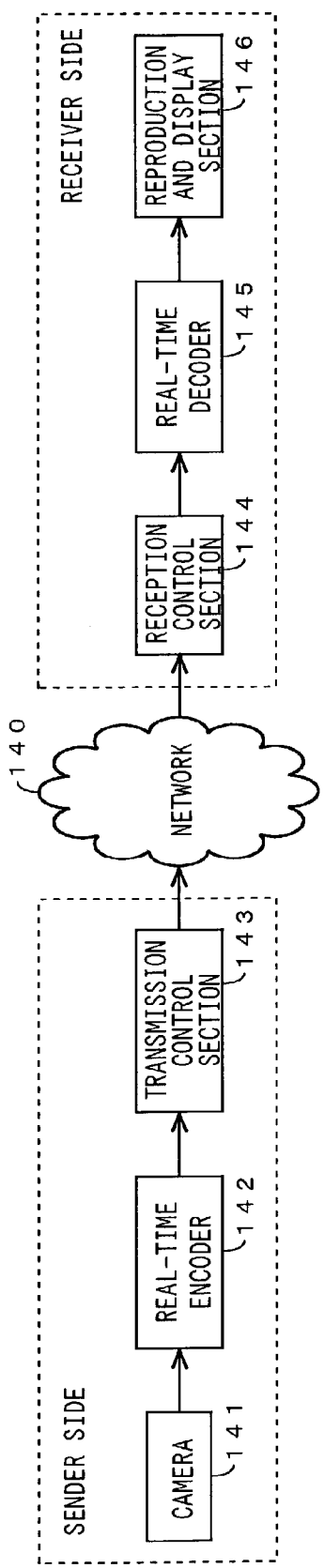

VIDEO INFORMATION TRANSMISSION SYSTEM, AND APPARATUS AND PROGRAM USED FOR VIDEO INFORMATION TRANSMISSION SYSTEM

BACKGROUND OF THE INVENTION

1. Field of the Invention

The present invention relates to a video information transmission system, and an apparatus and a program used for the video information transmission system. More specifically, the present invention relates to a video information transmission system, and an apparatus and a program used for the video information transmission system for efficiently transmitting video information such as a live video at real time while suppressing the degradation of video quality by controlling congestion on a network without QoS (Quality of Service) guarantee.

2. Description of the Related Art

On a QoS non-guaranteed IP network such as the Internet, a transmission bandwidth, a transmission error rate, a jitter and the like change with the passage of time. Due to this, if continuous media such as video or voice information are compression-transmitted and continuously reproduced, the degradation of quality occurs, making it often difficult to smoothly reproduce the continuous media.

FIG. 14 is a functional block diagram showing a conventional video information transmission apparatus. In FIG. 14, on a sender side, video information input from a camera 141 is subjected to a sequential compression processing by a real-time encoder 142 at a fixed transmission bit rate, packetized by a transmission control section 143, and output to an IP network 140.

On the other hand, on a receiver side, packets from the network 140 are received by a reception control section 144 at real time, reassembled, and decoded by a real-time decoder 145, and reproduced and displayed by a reproducing and display section 146.

In this case, even if the state of the network 140 changes and the bandwidth of the network 140 narrows, the sender side continues to transmit data at the fixed transmission bit rate equal to or larger than the bandwidth. As a result, network congestion occurs, packet propagation delay grows and packet loss is induced, so that the degradation of reproduction quality eminently appears on the receiver side.

There have been proposed measures to deal with these disadvantages by decreasing a transmission bit rate in accordance with an excess rate if a packet loss rate on a receiver side exceeds a certain threshold as described in "J. C. Bolt and T. Turletti, "Scalable feedback control for multicast video distribution in the Internet", ACM Proc. Sigcomm, pp. 58-67, London, UK, September 1994", and "I. Busse, B. Deffner, H. Schulzrinne, "Dynamic QoS Control of Multimedia Application based on RTP", ACM Computer Communications, June 1996". However, these measures have a disadvantage in that the transmission bit rate is not controlled before packet loss occurs and reproduction quality degrades. Further, if the packet loss is attributed to buffer overflow at a gateway on the network, the transmission bit rate is increased until the buffer on the network becomes full. Due to this, these measures have a disadvantage in that delay by as much as the size of the network buffer always occurs.

Moreover, there have been proposed measures by feeding back the queue length of a network switch, predicting the increase/decrease of transmission delay and controlling congestion as described in "H. Kanakia, P. Mishra, and A. Reibman, "An adaptive congestion control scheme for real-time packet video transport", ACM Proc. Sigcomm, pp. 20-31, September 1993". However, the measures require a mechanism in which each network switch feeds back queue length information, disadvantageously complicating packaging. Besides, the measures have a disadvantage in that data transmission cannot be realized using a standard protocol such as RTP (Real-time transport protocol)/RTCP (RTP control protocol) standardized under IETF RFC1889.

Furthermore, there have been proposed measures by setting a network buffer value to be close to a target value and thereby controlling congestion and fixing transmission delay as described in "Yano, et al., "Rate control method based on roundtrip time suited for real-time transfer of continuous media", IN98-23, CS98-23, MVE98-23, pp. 85-90, April 1998". However, the measures have disadvantages in that not only the optimum setting of a target buffer value is difficult but also the re-setting of the target value is necessary whenever the bandwidth of the network changes. Further, the measures have a disadvantage in that if the target buffer value is controlled to be fixed and the network bandwidth narrows by half, for example, delay doubles.

SUMMARY OF THE INVENTION

The present invention has been made to solve the conventional disadvantages stated above. It is an object of the present invention to provide a video information transmission system, and an apparatus and a program used for the video information transmission system that can transmit and reproduce real-time compressed video information such as a live video smoothly with high quality even on a QoS non-guaranteed network, by determining the congestion state of the network by, for example, monitoring a video information reception status and controlling the transmission of the video information on a sender side based on the determination result.

To attain this object, the first aspect of the present invention is that a sender side of a video information transmission system includes: transmission means for packetizing the compressed video data in units of frames or in small area encoding units, and transmitting the packetized compressed video data; and transmission control means for controlling transmission of the transmission means using congestion information on a network.

The second aspect of the present invention is that the congestion information on the network is input from an outside of the transmission control means through the network.

The third aspect of the present invention is that the transmission control means controls the transmission by temporally changing a transmission bit rate.

The fourth aspect of the present invention is that a receiver side of the video information transmission system includes: congestion information acquisition means for acquiring the congestion information on the network from received packets of the video data; and congestion information transmission means for transmitting the congestion information on the network to the sender side.

The fifth aspect of the present invention is that the congestion information transmission means transmits the congestion information on the network using RTCP (RTP Control Protocol) described in RFC1889.

The sixth aspect of the present invention is that the sender side of the video information transmission system includes: transmission means for packetizing the compressed video data in units of frames or in small area encoding units, and transmitting the packetized compressed video data; and transmission control means for controlling a transmission bit rate in accordance with a transmission bit rate input from an outside of the transmission control means through a network.

The seventh aspect of the present invention is that the receiver side of the video information transmission system includes: congestion information acquisition means for acquiring congestion information on the network from received packets of the video data; transmission bit rate decision means for deciding the transmission bit rate using the congestion information on the network acquired by the congestion information acquisition means; and transmission bit rate transmission means for transmitting the transmission bit rate decided by the transmission bit rate decision means to the sender side.

The eighth aspect of the present invention is that the congestion information on the network includes at least a network jitter or a packet loss rate.

The ninth aspect of the present invention is that the congestion information on the network is categorized into a plurality of congestion levels by a queue overflow detection processing performed on a network gateway based on the packet loss rate, and by a propagation delay increase detection processing by a threshold processing conducted to a variation of the network jitter, whereby a congestion state of the network is determined.

The tenth aspect of the present invention is that the packet loss rate is measured at certain time intervals.

The eleventh aspect of the present invention is that the packet loss rate is measured at intervals of time since start of transmission or reception until present time.

The twelfth aspect of the present invention is that a determination result of the congestion state of the network is used to control transmission while avoiding congestion by changing the transmission bit rate according to the determination result.

The thirteenth aspect of the present invention is that the determination result of the congestion state of the network includes a degree of the packet loss rate and the degree of the packet loss rate is used to adjust a decrease width of the transmission bit rate according to the degree of the packet loss rate.

The fourteenth aspect of the present invention is that the determination result of the congestion state of the network includes a degree of the variation of the network jitter and the degree of the variation of the network jitter is used to adjust a decrease width of the transmission bit rate according to the degree of the variation of the network jitter.

The fifteenth aspect of the present invention is that increase of the transmission bit rate is instructed only if congestion is extremely small, the variation of the network jitter is not more than a certain threshold, and the packet loss rate is not more than a certain threshold.

The sixteenth aspect of the present invention is that increase of the transmission bit rate is instructed and the transmission bit rate is controlled to be stable only after certain time passes since the transmission bit rate is previously decreased.

The seventeenth aspect of the present invention is that the present invention is a program allowing a computer to execute the following procedures for each transmission control timing for receiving a control signal in a video information transmission system: a procedure for comparing input congestion information on a network with a threshold, and determining whether extreme congestion occurs to at least the network, slight congestion occurs to at least the network, and the congestion tends to be eliminated or is eliminated; a procedure for decreasing a transmission bit rate by a first proportion if it is determined that the extreme congestion occurs to the network; a procedure for decreasing the transmission bit rate by a second proportion if it is determined that the slight congestion occurs to the network; and a procedure for increasing the transmission bit rate by a third proportion if it is determined that the congestion state of the network tends to be eliminated or is eliminated.

According to the first to seventeenth features, it is possible to control the transmission of the video information in accordance with the congestion state of the network, and to transmit and reproduce real-time compressed video information such as a live video smoothly with high quality even on a QoS non-guaranteed network.

According to the fifth feature, it is possible to transmit the congestion information on the network according to the Internet standard.

According to the seventh feature, the receiver side decides the transmission bit rate and feeds back the decided transmission bit rate to the sender side. Therefore, compared with a case of feeding back various pieces of congestion information, it is possible to decrease the quantity of information to be fed back and to make effective use of the network.

According to the ninth and twelfth features, the congestion information on the network is categorized into a plurality of congestion levels and then the congestion state of the network is determined. This facilitates processing and enables an acceleration processing.

According to the fifteenth feature, if the congestion of the network tends to be eliminated or is eliminated, the transmission bit rate can be increased to thereby efficiently transmit the video information.

According to the sixteenth feature, it is possible to prevent the recovery of the congestion state and the great fluctuation of the transmission bit rate by slow-start control.

Further, according to the seventeenth feature, by installing a program in to a computer, it is possible to easily control the transmission of video information.

BRIEF DESCRIPTION OF THE DRAWINGS

FIG. 4 shows one example of an SR format employed in the present invention;

FIG. 5 shows one example of an RR format employed in the present invention;

FIG. 8 is an explanatory view for explaining the meanings and contents of various parameters employed in the algorithm shown in FIG. 7;

FIG. 11 shows one example of the format of an RR packet if a transmission bit rate is fed back to a sender side;

FIG. 14 is a functional block diagram showing a conventional video information transmission apparatus.

DETAILED DESCRIPTION OF THE PREFERRED EMBODIMENT

The present invention will be described hereinafter in detail with reference to the drawings.

Figure 1A:
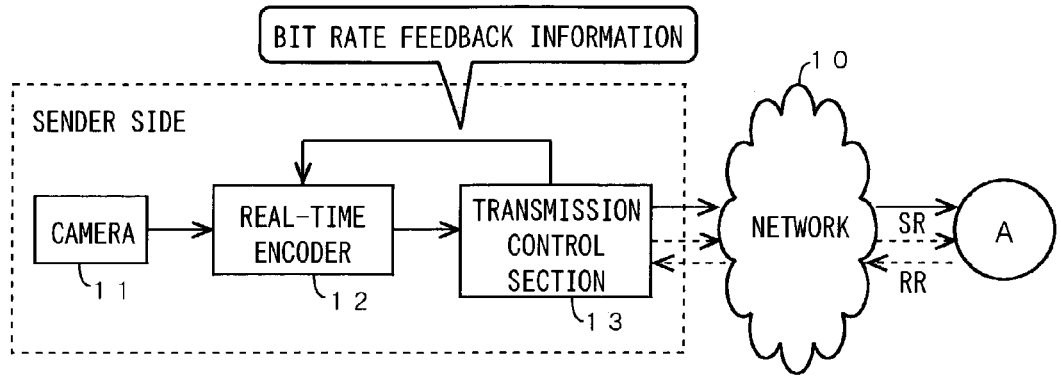
FIGS. 1a and 1b are functional block diagrams showing one embodiment of the present invention.
Figure 1B:
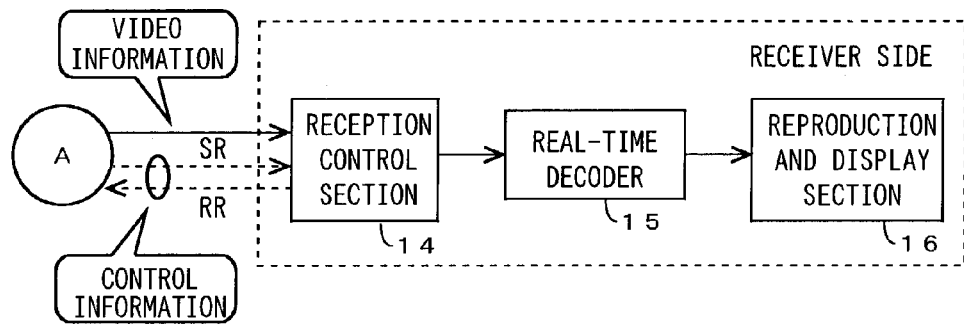

FIGS. 1a and 1b are functional block diagrams showing one embodiment of the present invention. For the sake of convenience, the block diagram is divided into FIG. 1a and FIG. 1b at a point A. On a sender side in FIG. 1a, video information input from a camera 11 is encoded at real time by a real-time encoder 12 at a transmission bit rate designated by a transmission control section 13. The transmission bit rate of the real-time encoder 12 is designated based on bit rate feedback information from the transmission control section 13. The video data encoded and compressed by the real-time encoder 12 at the designated transmission bit rate, is packetized by the transmission control section 13 in the units of frames or slices which can be re-synchronized and decoded from their respective position even if packet loss occurs, and then transmitted to the network 10.

Figure 2:
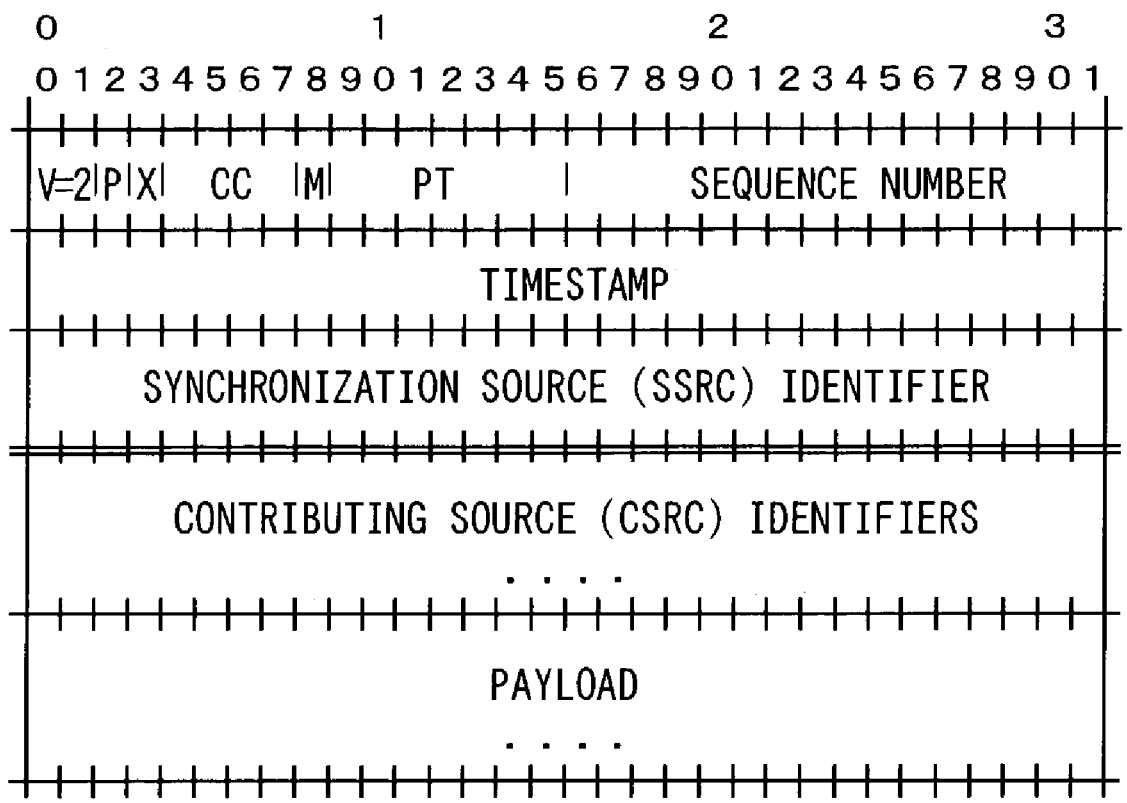
FIG. 2 shows one example of a data format employed in the present invention.

This transmission data format is such that each packet is allocated a serial number so that a receiver side can know the sequence of transmitted packets and reproduction timings of the packets, and that each packet is also allocated a time stamp which represents the reproduction timing of data included in the packet. The format for storing a serial number and a time stamp in each transmission packet is exemplified by an RTP (Real-time Transport Protocol) data format under RFC1889 shown in FIG. 2. The transmission control section 13 transmits video data packets, for example, in accordance with this format. It is noted that "sequence number" shown in FIG. 2 corresponds to the serial number.

The video data packets transmitted by the network 10 are received by a reception control section 14 on a receiver side in FIG. 1b. The reception control section 14 detects irregular video data packet reception statuses such as video data packet loss, the change of a packet arrival sequence, and multiple reception based on the serial numbers stored in the respective received video data packets. Further, the reception control section 14 determines whether each received data packet is in time for reproduction time based on the time stamp which represents a reproduction timing. If it is determined that the received video data packet is late for the reproduction time, the video data packet is regarded as a lost packet and abandoned.

Video data stored in the payload of each video data packet determined to be in time for the reproduction time is fetched from the payload. This video data together with the time stamp is passed to a real-time decoder 15, decoded at real time by the real-time decoder 15, and then reproduced and displayed by a reproduction and display section 16 in accordance with the time stamp. Video data on the packet which is lost or regarded as a lost packet is generated by the reproduction and display section 16 by inter-frame interpolation or intra-frame interpolation and the video data thus generated is reproduced and displayed at a display timing which is predicted from the order of the sequence number.

One example of a concrete method for determining whether the packet received on the receiver side is in time for reproduction time will now be described. First, reproduction time $\{PT0, PT1, PT2, PT3, \ldots, PTn\}$ of the received video data packets is obtained in accordance with the following formula (1). This means that the time stamps $\{TS0, TS1, TS2, TS3, \ldots, TSn\}$ allocated to the respective received video data packets are converted with the time stamp value of the video data packet which arrives first set as reference time 0[ms].

Next, reception time $\{RT0, RT1, RT2, RT3, \ldots, RTn\}$ converted from reception time $\{CKRT0, CKRT1, CKRT2, CKRT3, \ldots, CKRTn\}$ when the video data packets are received as counted by a local clock with the reception time of the first arrival packet set as reference time 0[ms], is obtained in accordance with the following formula (2), and then a time difference $PRDIFFk\{k=0, 1, 2, \ldots, n\}$ between the time given by the formula (1) and that given by the formula (2), is obtained in accordance with the following formula (3).

Figure 3:
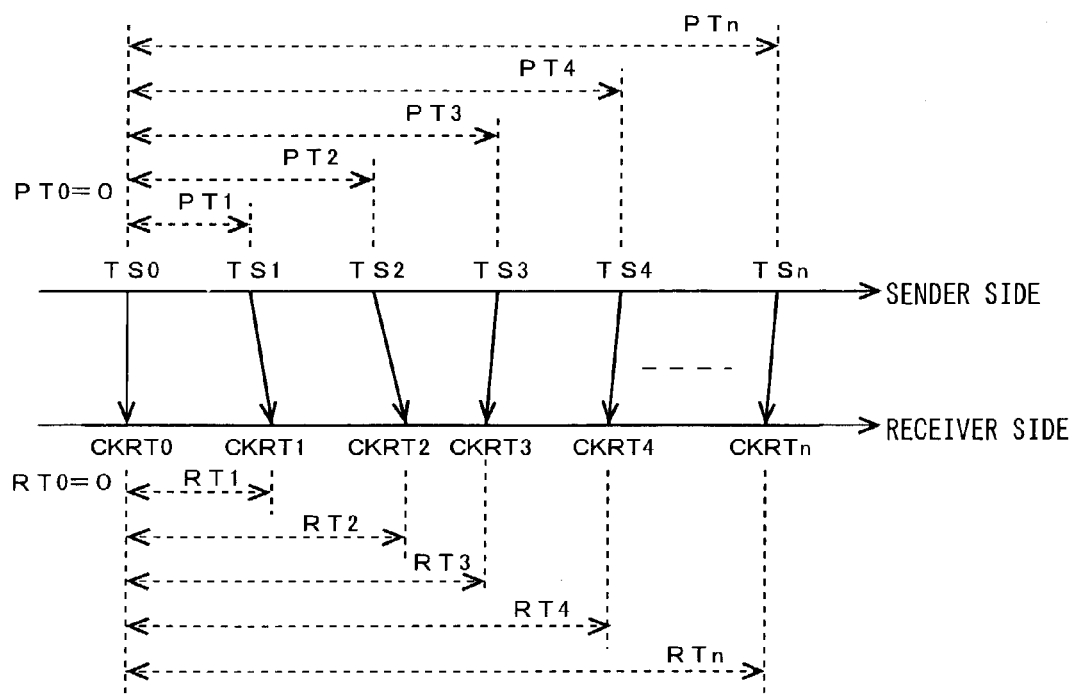
FIG. 3 is an explanatory view for explaining the relationship between the reception time and reproduction time of a video data packet.

If the time difference $PRDIFFk \{k=0, 1, 2, \ldots, n\}$ is not less than 0, it is determined that the received video data packet is in time for the reproduction time. If PRDIFFk is less than 0 (minus value), it is determined that the received video data packet is late for the reproduction time. If it is determined that the received video data packet is in time for the reproduction time, the video data packet is subjected to following decoding and reproduction processings. If it is determined that the received video data packet is late for the reproduction time, the video data packet is regarded as a lost packet and not subjected to the decoding and reproduction processings. The relationship among TSk, CKRTk, PTk, and RTk is shown in FIG. 3.

$$PTk = TSk - TS0 \{k=0, 1, 2, \ldots, n\} \qquad (1)$$

$$RTk = CKRTk - CKRT0 \{k=0, 1, 2, \ldots, n\} \qquad (2)$$

$$PRDIFFk = PTk - RTk \{k=0, 1, 2, \ldots, n\} \qquad (3).$$

So far, the compression transmission, reception and reproduction of the video information have been described. The transmission control section 13 transmits not only the video data packets but also a control signal SR (Sender Report) packet (to be referred to as "SR packet" hereinafter) used to measure the quality parameters of the network and to determine the congestion state of the network. This SR packet is regularly transmitted from the transmission control section 13 to the reception control section 14 on the receiver side in FIG. 1b.

The format of the SR packet includes time information (transmission time stamp) which represents transmission time. This format is exemplified by an SR: Sender report RTCP Packet data format under RFC1889 shown in FIG. 4.

Further, the reception control section 14 regularly transmits a control signal RR (Receiver Report) packet (to be referred to as "RR packet" hereinafter) to the transmission control section 13. The format of this RR packet includes transmission time stamp information included in the latest SR packet among the SR packets received thus far and time passage information on the passage of time since the receiver side receives the SR packets until transmitting the RR packet. The format of the RR packet is exemplified by an RTCP (RTP Control Protocol) RR format under RFC1889 shown in FIG. 5.

The transmission control section 13 which has received the RR packet can obtain the roundtrip propagation time (roundtrip time) of the control signal packets (SR packet and RR packet) in accordance with the following formula (4).

$$Tmd=(Trev-Tsnd)-Tstay \qquad (4).$$

In the formula (4), the symbols denote as follows:

Trnd: the roundtrip propagation delay of the control signal packet;

Trev: the time at which the transmission control section receives the latest RR packet;

Tsnd: the time at which the transmission control section transmits the latest SR packet (the transmission time stamp information included in the RR packet); and Tstay: the time required since the reception control section receives the latest SR packet until transmitting the SR packet (the time passage information stored in the RR packet).

Furthermore, the format of the RR packet includes network congestion information such as a packet loss rate and jitter information which represents a propagation delay fluctuation in relation to the video data packets received by the reception control section 14. The packet loss rate and the jitter included in the $n^{th}$ transmitted RR packet can be obtained by the reception control section 14 in accordance with, for example, the following formulas (5), (6), and (7).

$$PLRn=TRUNC(Nloss-n/Nrev-n*256) \qquad (5)$$

$$Jn=Jn-1+(|D|-Jn-1)/16 \qquad (6)$$

$$D=(CKRTk-TSk)-(CKRTk-1-TSk-1) \qquad (7).$$

In the formulas (5), (6) and (7), the symbols denote as follows:

PLR: the packet loss rate of video data packets;

TRUNC: to round down numbers of decimal points;

Nloss: the number of lost video data packets since the previous RR packet is transmitted until the present RR packet is transmitted;

Nrev: the number of video data packets received since the previous RR packet is transmitted until the present RR packet is transmitted;

Jn: $n^{th}$ jitter;

Jn−1: $n-1^{th}$ jitter;

D: the propagation delay difference between the video data packets;

CKRTk: the reception time of the video data packet received last;

TSk: the time stamp (corresponding to transmission time) included in the video data packet received last;

CKRTk−1: the reception time of the video data packet received just before the video data packet received last; and.

TSk−1: the time stamp (corresponding to the transmission time) included in the video data packet received just before the video data packet received last.

It is noted that the packet loss rate PLR can be also obtained using the cumulative number of video data packets lost and the number of all the received video data packets since the transmit start time to the present time instead of Nloss and Nrev.

The transmission control section 13 which has received the RR packet transmitted from the reception control section 14 on the receiver side, determines the congestion state of the network based on the packet loss rate and the jitter information which represents a propagation delay fluctuation that are included in the RR packet, and decides a transmission bit rate capable of avoiding the congestion using the determination result. This transmission bit rate is fed back, as bit rate feedback information, to the real-time encoder 12, whereby the encoding bit rate of the real-time encoder 12 is controlled.

Next, the determination of the congestion state of the network based on the packet loss rate and the jitter information which represents a propagation delay fluctuation, and the decision of the transmission bit rate capable of avoiding the congestion based on the determination result will be described concretely.

Figure 6:
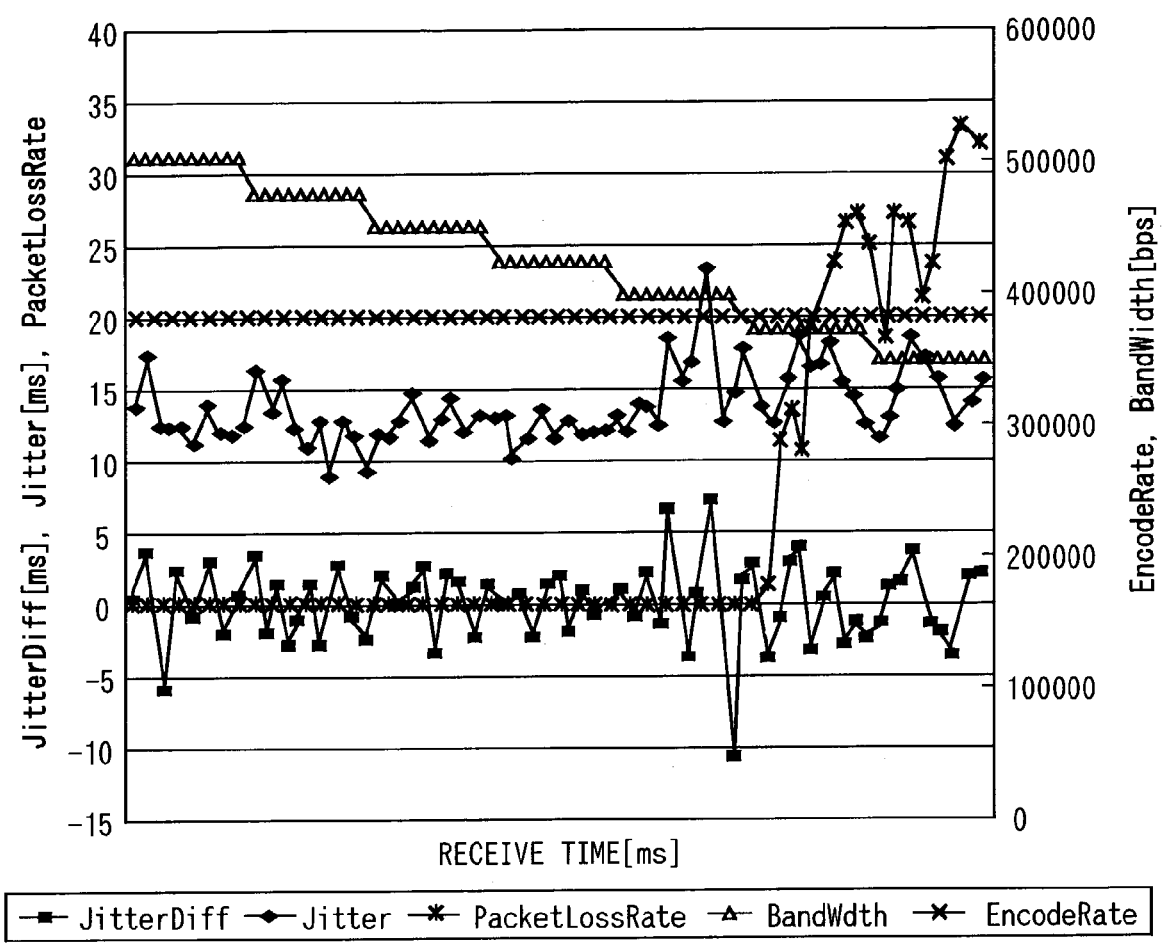
FIG. 6 is a graph showing the results of an experiment with respect to the changes of a jitter, a jitter difference absolute value, and a packet loss rate if transmission bandwidth changes.

The result of a preliminary experiment to determine how a jitter, a jitter difference absolute value, a packet loss rate change if the transmission bandwidth of the network changes, is shown in FIG. 6. As can be seen from FIG. 6, if the transmission bandwidth (BandWidth) is below the transmission bit rate (EncodeRate) at about ¾ of the reception time (ReceiveTime), the packet loss rate (PacketLossRate) which has been around 0 greatly increases. This is considered to be an extreme congestion state.

It can be seen that the jitter (Jitter) and Jitter difference absolute value (JitterDiff) increase just before the packet loss rate starts increasing. This indicates that queues existing in a router or the like on the network is near full and the video data packet propagation delay is gradually increasing. This is considered to be a middle-level congestion state just before the occurrence of the packet loss.

The result of the preliminary experiment evidences that it is possible to determine in which state the network is at present, using the packet loss rate and the jitter difference absolute value. In this embodiment, based on this determination, the congestion states of the network are modeled as Case 1 to Case 5 as shown below and the transmission bit rate is decided. It is noted that the reason for using the jitter difference absolute value is that it is easier to set the threshold than the jitter.

Case 1: a case where extreme congestion occurs;

Case 2: a case where middle-level congestion occurs;

Case 3: a case where slight congestion occurs;

Case 4: a case where congestion is extremely slight and the congestion tends to be eliminated; and Case 5: a case where congestion is avoided.

Figure 7:
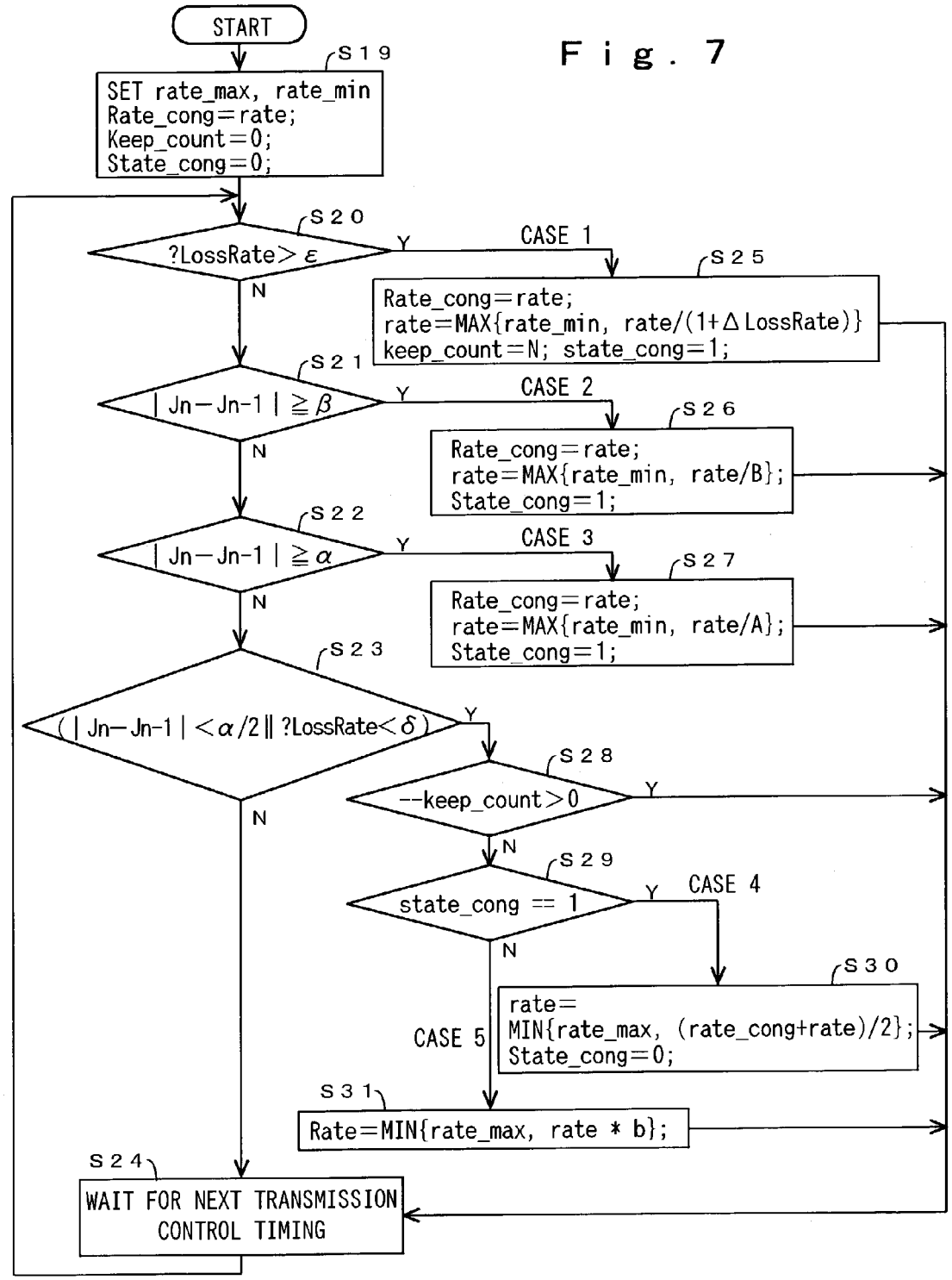
FIG. 7 is a flow chart showing one example of a transmission control algorithm including the determination of a congestion state and the decision of an encoding bit rate.

FIG. 7 is a flow chart showing a transmission control algorithm including the determination of the congestion state of the network and the decision of the transmission bit rate (transmission bit rate). FIG. 8 shows the meanings and contents of various parameters used in the algorithm shown in FIG. 7.

First, in a step S19, initial values of parameters such as MIN/MAX values of a settable bit rate are set. In a step S20, the packet loss rate is compared with a threshold ε to determine whether extreme congestion occurs. If the determination result is No, the processing proceeds to a step S21 to make the next determination. If the determination result of the step S21 is Yes (Case 1), the present transmission bit rate (rate) is decreased in accordance with the packet loss rate in a step S25.

In this case, a limit rate_min is set so that the transmission bit rate (rate) is not extremely decreased. The same thing is true for following steps S26 and S27. In addition, not only 1 is assigned to a parameter state_cong but also a value N, e.g., about 10 to 20, is assigned to a hysteresis parameter keep_count so as not to increase the rate right after the extreme congestion. In a step S24, the next control timing is waited for.

If the determination result does not correspond to Case 1 ("No" in the determination in the step S20), the jitter difference absolute value is compared with a threshold β to determine whether middle-level congestion occurs in a step S21. If the determination result is No, the processing proceeds to a step S22 to make the next determination. If the determination result of the step S22 is Yes (Case 2), the transmission bit rate (rate) is divided by a value designated by a parameter B to thereby decrease the rate, and 1 is assigned to the parameter state_cong in a step S26. In the step S24, the next control timing is waited for.

If the determination result does not correspond to Case 2 ("No" in the determination of the step S21), the jitter difference absolute value is compared with a threshold α (<β) to determine whether slight congestion occurs in a step S22. If the determination result of the step S22 is No, the processing proceeds to a step S23 to make the next determination. If the determination result of the step S23 is Yes (Case 3), the transmission bit rate (rate) is divided by a value designated by a parameter A (<B)to thereby decrease the rate and 1 is assigned to the parameter state_cong in a step S27. In the step S24, the next control timing is waited for.

If the determination result does not correspond to Case 3 ("No" in the determination of the step S22), the jitter difference absolute value is compared with a threshold α/2 and the packet loss rate is compared with a threshold δ in the step S23. If the comparison shows that the jitter difference absolute value is smaller than the threshold α/2 or the packet loss rate is smaller than the threshold δ (Yes), it can be determined that congestion is extremely slight or avoided. If the determination result of the step S23 is No, it is determined that the case cannot be specified as extreme congestion or congestion avoidance. The processing proceeds to the step S24 in which the next control timing is waited for.

If the determination result of the step S23 is Yes, the processing proceeds to a step S28 to determine the value of the keep_count value. If the determination result shows that a value obtained by subtracting 1 from $keep_{13}$ count is greater than 0, the increase of the transmission bit rate is stopped. The processing proceeds to the step S24 in which the next control timing is waited for. This loop intends to keep the transmission bit rate unchanged in accordance with the value N for certain time even if the congestion is extremely slight or avoided. If the value obtained by subtracting 1 from keep_count is not more than 0, it is determined whether congestion occurred previously using the state_cong in a step S29.

If the determination result of the step S29 is Yes (Case 4), the transmission bit rate (rate) is set at an intermediate value between the transmission bit rate during the previous congestion and the present transmission bit rate, and 0 is assigned to the state_cong in a step S30. The processing proceeds to the step S24 to wait for the next control timing. In this case, a limit rate_max is set so as not to extremely increase the transmission bit rate (rate). The same thing is true for the following step S31.

If the determination result of the step S29 is Yes (Case 5), the transmission bit rate (rate) is multiplied by b in the step S31. The processing proceeds to the step S24 to wait for the next control timing. For the first time, at this moment, the possibility of the setting of the transmission bit rate to exceed that during the previous congestion is considered. Namely, if the transmission bit rate is increased, the recovery of the congestion state or the great fluctuation of the transmission bit rate is prevented using slow-start control which is employed in TCP control.

Further, as shown in this embodiment, if extreme congestion occurs, the transmission bit rate is decreased in accordance with the packet loss rate. If congestion smaller than the extreme congestion occurs, the transmission bit rate is decreased in accordance with a fixed parameter. It is thereby possible to change the transmission bit rate swiftly and stably and to avoid congestion. Alternatively, the transmission bit rate can be decreased in accordance with a variation of the network jitter. Further, the transmission control timing in this flow chart can be set as a timing at which the sender side receives the RR packet regularly transmitted from the reception side.

Figure 9:
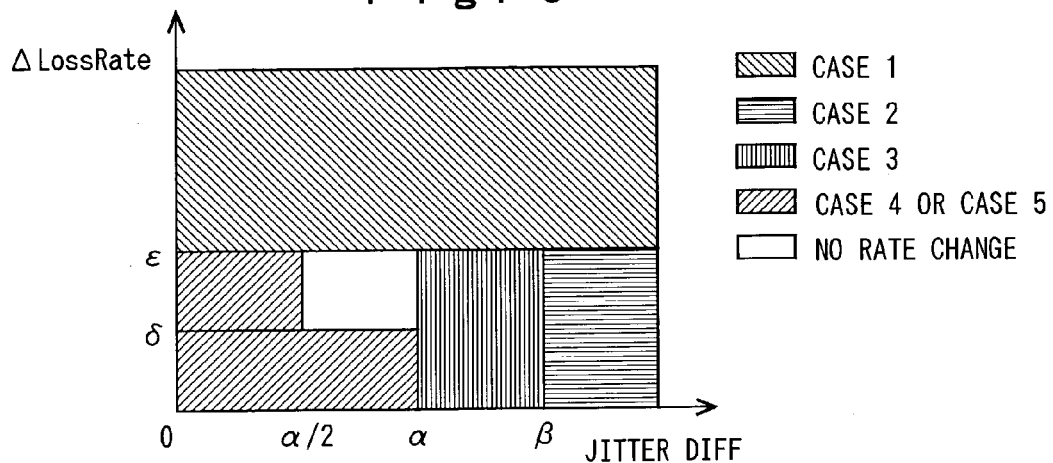
FIG. 9 is a graph showing ranges which respective congestion states can take for the packet loss rate and the jitter difference absolute value.

FIG. 9 shows the ranges which the network congestion states, Case 1 to Case 5, can take as a two-dimensional graph between the packet loss rate, ΔlossRate, and the jitter difference absolute value, JitterDiff, based on the determinations in accordance with the flow chart. As is obvious from FIG. 9, the transmission bit rate can be increased if the variation of the network jitter is not more than α and the packet loss rate is not more than ε, and the variation of the network jitter is not more than α/2 or the packet loss rate is not more than δ.

Figure 10:
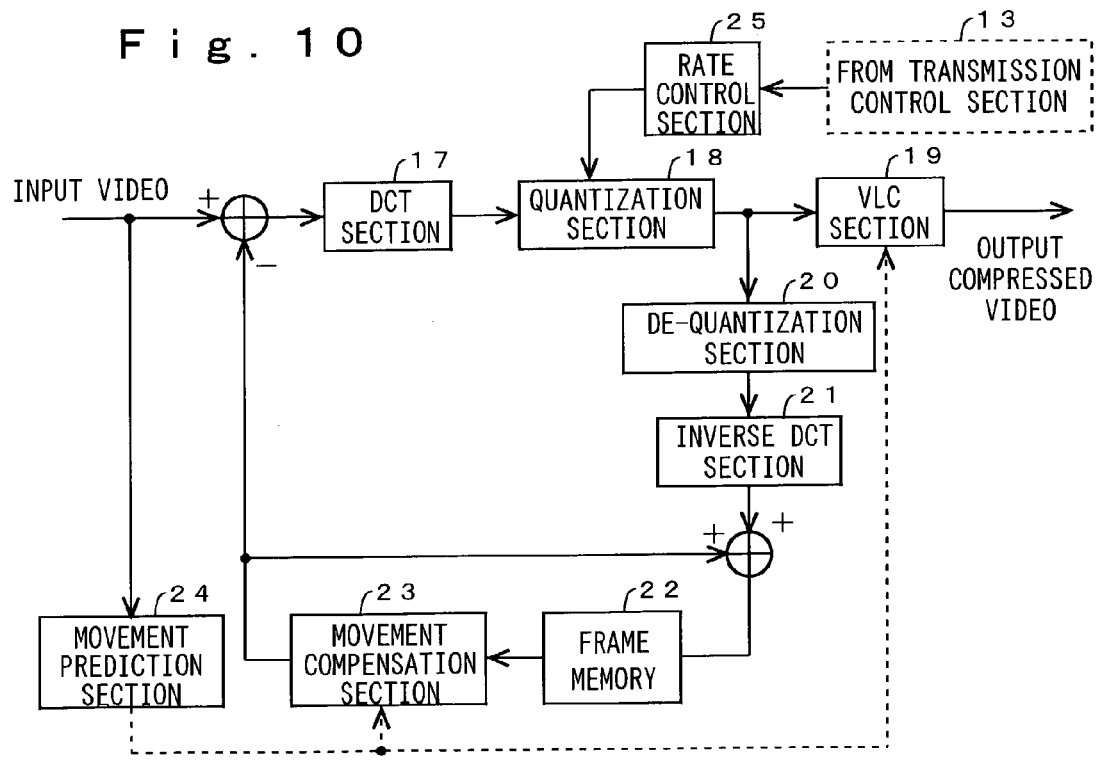
FIG. 10 is a functional block diagram showing one example of a real-time encoder which can be employed in the present invention.

FIG. 10 is a functional block diagram showing one example of the real-time encoder which can be employed in the present invention. In this example, an MPEG encoder is shown. Now, the operation of this real-time encoder will be schematically described.

Intra encoded frames including the first frame of the input video information are subjected to discrete cosine transform by a DCT section 17. The resultant frames are quantized (the information quantities of the frames are decreased) by a quantization section 18 at a quantization scale factor designated by a rate control section 25, encoded to a variable length by a VLC section 19, and then output as a compressed video output stream. In addition, video data of the intra encoded frames after being quantized by the quantization section 18 is de-quantized and subjected to inverse discrete cosine transform by a de-quantization section 20 and an inverse DCT section 21, respectively, and then stored in a frame memory 22.

The forward-direction prediction frame and two-direction prediction frame of the video information input next are subjected to movement prediction by a movement prediction section 24. A movement vector calculated as a result of the prediction is applied to a movement compensation section 23. The movement compensation section 23 compensates for the movement of an image stored in the frame memory 22, i.e., the movement of a reference image. The difference between the movement-compensated reference image and an original image is obtained by a subtracter to thereby obtain a differential image. This differential image is subjected to discrete cosine transform by the DCT section 17, and quantized by the quantization section 18 at the quantization scale factor designated by the rate control section 25. The resultant image together with movement information is subjected to variable length encoding by the VLC section 19, and the resultant code is output as a compressed video output stream.

Since the forward-direction prediction frame is used as a reference image, the quantized data is de-quantized by the de-quantization section 19 and subjected to inverse discrete cosine transform by the inverse DCT section 21. Frame data of the movement-compensated reference image used when generating the differential image is added to the resultant frame to re-construct frame data and the re-constructed frame data is stored in the frame memory 22.

In encoding on the assumption of normal transmission, fixed bit rate (CBR) encoding is conducted. Due to this, the rate control section 25 exercises rate control over the same target bit rate. According to the present invention, by contrast, the bit rate is dynamically changed in accordance with the congestion state of the network. Due to this, the rate control section 25 changes the target bit rate in accordance with a bit rate change instruction which is issued from the transmission control section 13 in accordance with the congestion state of the network, and controls the transmission bit rate accordingly.

In the embodiment described above, the video data and control signals compressed and packetized on the sender side are transmitted to the network. On the receiver side, the network congestion information such as a packet loss rate and a jitter is acquired based on the video data and control signals received from the network and this network congestion information is fed back to the sender side. On the sender side, the network congestion state is determined based on the network congestion information thus fed back and decides the transmission bit rate. In this way, the transmission bit rate is set dynamically in accordance with the congestion state of the network. Therefore, even if the transmission bandwidth, transmission error rate, the jitter and the like of the network change with the passage of time, it is possible to always transmit video information smoothly with high quality.

Another embodiment of the present invention will be described. In the preceding embodiment, the sender side determines the congestion state of the network based on the network congestion information fed back from the receiver side, and decides the transmission bit rate. In this embodiment, the receiver side determines the congestion state of the network and decides the transmission bit rate. The transmission bit rate decided by the receiver side is fed back, as a changed bit rate, to the sender side. If the bit rate has no change, it is unnecessary to feed back the bit rate to the sender side.

Since the overall configuration of the system, the determination of the congestion state and the decision of the transmission bit rate are the same as those in the preceding embodiment, they will not be described herein in detail. The determination of the congestion state and the decision of the transmission bit rate are conducted by the reception control section 14 shown in FIG. 1b. The transmission bit rate decided by the reception control section 14 is fed back to the sender side. Since it is necessary to feed back the transmission bit rate decided on the receiver side to the sender side, it is necessary to provide an area for storing the transmission bit rate in the format of the RR packet. This format can be exemplified by a data format shown in FIG. 11. In this format, a Sending Bitrate Requested (SBR) area of 32 bits for storing the transmission bit rate is provided.

According to this embodiment, it suffices that the transmission bit rate decided on the receiver side based on the network congestion information is fed back to the sender side. Therefore, compared with the preceding embodiment in which various pieces of congestion information on the network are transmitted, it is possible to decrease the quantity of transmitted information and to make effective use of the network.

Procedures for the determination of the congestion state and the decision of the transmission bit rate conducted by the transmission control section 13 according to the present invention can be constituted as a program which allows a computer to execute the procedures. This program is intended to allow the computer to execute the following procedures at each transmission control timing for receiving regular control signals.

(S1) A procedure for comparing the input congestion information on the network with a threshold, and determining whether extreme congestion occurs to at least the network, slight congestion occurs to at least the network, extremely slight congestion occurs and the congestion tends to be eliminated or is eliminated.

(S2) A procedure for decreasing the transmission bit rate by a first proportion if it is determined that extreme congestion occurs to the network.

(S3) A procedure for decreasing the transmission bit rate by a second proportion if it is determined that slight congestion occurs to the network.

(S4) A procedure for increasing the transmission bit rate by a third proportion if it is determined that the congestion is extremely slight and the congestion tends to be eliminated or is eliminated.

Figure 12:
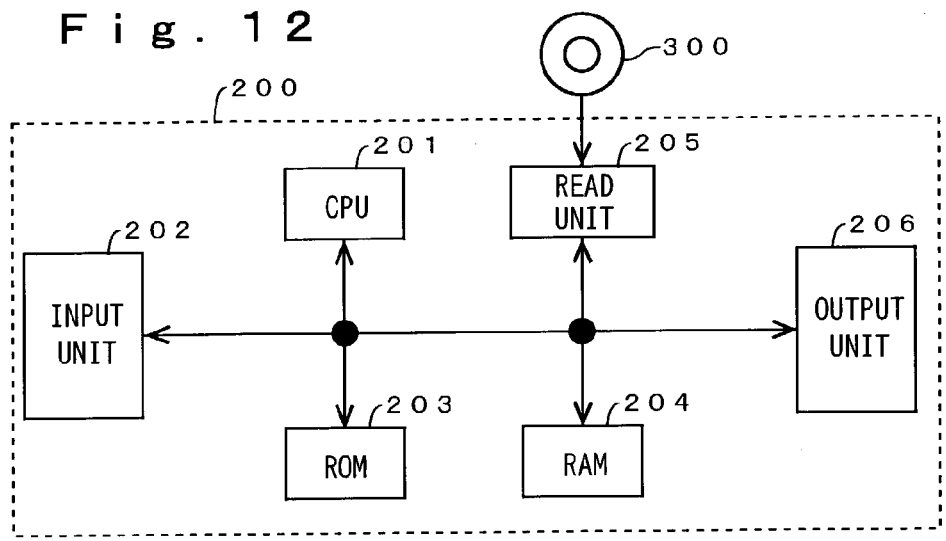
FIG. 12 is a block diagram for explaining one example of constituting the present invention as a program.

The transmission control program for allowing a computer to execute the above-stated procedures can be recorded on, for example, a computer readable recording medium 300 shown in FIG. 12, and the transmission control program recorded on the recording medium 300 can be read by a computer 200 shown in FIG. 12, and the procedures can be thereby executed by the computer 200.

The computer 200 consists of a CPU 201 which executes the read transmission control program, an input unit 202 such as a keyboard, a mouse and the like, a ROM (Read Only Memory) 203 which stores various pieces of data, a RAM (Random Access Memory) 204 which stores operation parameters and the like, a read unit 205 which reads the transmission program from the recording medium 300, an output unit 206 such as a display, a printer and the like, and a bus, BUS which connects the constituent elements of the computer 200 to one another.

After reading the transmission control program recorded on the recording medium 300 through the read unit 205, the CPU 201 executes this transmission control program and thereby performs a transmission control processing. The recording medium 300 is exemplified by not only a portable recording medium such as an optical disk, an FD, and a hard disk, but also a transmission medium, such as the network, which temporarily records and stores data.

The embodiments of the present invention have been described so far. However, the concrete constitution of the present invention is not limited to these embodiments. Any changes in design within the scope of the present invention can be included in the present invention. For example, the jitter difference absolute value is used as the variation of the network jitter in the above-stated embodiments. However, even if the difference value between a present jitter or the average of a plurality of jitters including the present jitter and a minimum jitter is used as the variation of the network jitter, good results can be attained. Such a variation is also included in the variations of the network jitter according to the present invention.

Furthermore, a sender-side apparatus and a receiver-side apparatus according to claims can be variously combined to constitute a video information transmission system.

As is evident from the above, according to the present invention, the network congestion information such as the packet loss and the jitter is acquired from the video data packets and control signals received at real time, the congestion state of the network is determined from the congestion information, and the transmission bit rate is dynamically controlled based on this determination result, whereby it is possible to transmit video information smoothly with high quality at real time even on the QoS non-guaranteed network.

Figure 13:
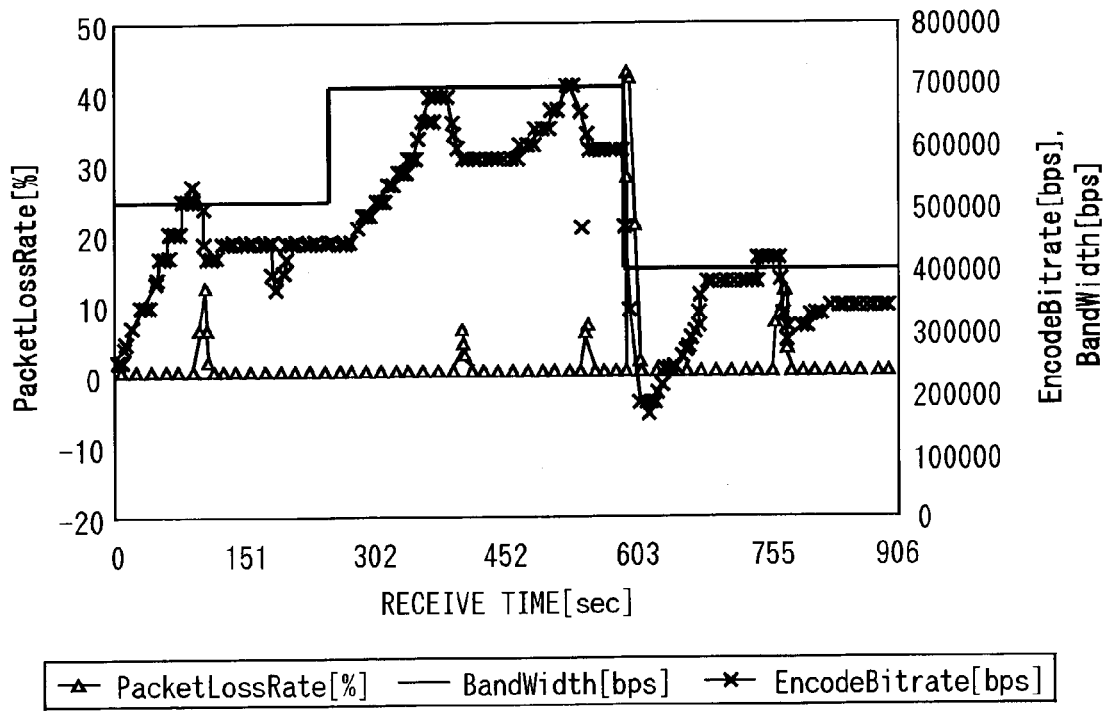
FIG. 13 is a graph showing a transmission simulation result according to the present invention.

FIG. 13 shows the result of the transmission simulation according to the present invention. As can be seen from FIG.

13, even if the transmission bandwidth of the network changes, the transmission bit rate is controlled to minimize packet loss and to sufficiently effectively utilize the transmission bandwidth. As a result, it is possible to transmit video information efficiently and smoothly with high quality.

The present invention is applicable to an MPEG transmission system which compression-transmits video information at real time, a two-way video transmission system, a teleconference system, a video chat system, a video relay system and the like.

What is claimed is:

1. A video information transmission system for transmitting compressed video data, comprising:
   transmission means, provided on a sender side, for packetizing the compressed video data in units of frames or in small area encoding units, and transmitting the packetized compressed video data; and
   transmission control means, provided on the sender side, for controlling transmission of the transmission means using congestion information on a network,
   wherein the congestion information on the network includes at least a network jitter and a packet loss rate, and is categorized into a plurality of congestion levels by a queue overflow detection processing performed on a network gateway based on the packet loss rate, and by a propagation delay increase detection processing by a threshold processing conducted to a variation of the network jitter, whereby a congestion state of the network is determined,
   wherein a determination result of the congestion state of the network is used to control transmission while avoiding congestion by changing the transmission bit rate according to the determination result,
   wherein increase of the transmission bit rate is instructed only if the variation of the network jitter is not more than a first threshold and the packet loss rate is not more than a second threshold, and the variation of the network jitter is not more than a third threshold (third threshold<first threshold) or the packet loss rate is not more than a fourth threshold (fourth threshold<second threshold), and
   wherein if the packet loss rate is more than the first threshold, an extreme congestion is assumed, wherein if the packet loss rate is not more than the first threshold and the variation of the network jitter is more than the second threshold, a middle-level congestion is assumed, and wherein if the packet loss rate is not more than the first threshold and the variation of the network jitter is not more than the second threshold and the packet loss rate is not more than a third threshold (third threshold<first threshold) or the variation of the network jitter is not more than a fourth threshold (fourth threshold<second threshold), a case where the congestion is being eliminated or has been eliminated is assumed, then increase of the transmission bit rate is instructed.

2. The video information transmission system according to claim 1, wherein the congestion information on the network is input from outside of the transmission control means through the network.

3. The video information transmission system according to claim 1, wherein the transmission control means controls the transmission by temporally changing a transmission bit rate.

4. The video information transmission system according to claim 1, comprising:
   congestion information acquisition means, provided on a receiver side, for acquiring the congestion information on the network from received packets of the video data; and
   congestion information transmission means, provided on the receiver side, for transmitting the congestion information on the network to the sender side.

5. The video information transmission system according to claim 4, wherein the congestion information transmission means transmits the congestion information on the network using RTCP (RTP Control Protocol) described in RFC1889.

6. A video information transmission system for transmitting compressed video data, comprising:
   transmission means, provided on a sender side, for packetizing the compressed video data in units of frames or in small area encoding units, and transmitting the packetized compressed video data;
   transmission control means, provided on the sender side, for changing a transmission bit rate of the transmission means in accordance with a transmission bit rate input from an outside of the transmission control means through a network;
   congestion information acquisition means, provided on a receiver side, for acquiring congestion information on the network from received packets of the video data;
   transmission bit rate decision means, provided on the receiver side, for deciding the transmission bit rate using the congestion information on the network acquired by the congestion information acquisition means; and
   transmission bit rate transmission means, provided on the receiver side, for transmitting the transmission bit rate decided by the transmission bit rate decision means to the sender side,
   wherein the congestion information on the network includes at least a network jitter and a packet loss rate, and is categorized into a plurality of congestion levels by a queue overflow detection processing performed on a network gateway based on the packet loss rate, and by a propagation delay increase detection processing by a threshold processing conducted to a variation of the network jitter, whereby a congestion state of the network is determined,
   wherein a determination result of the congestion state of the network is used to control transmission while avoiding congestion by changing the transmission bit rate according to the determination result,
   wherein increase of the transmission bit rate is instructed only if the variation of the network jitter is not more than a first threshold and the packet loss rate is not more than a second threshold, and the variation of the network jitter is not more than a third threshold (third threshold<first threshold) or the packet loss rate is not more than a fourth threshold (fourth threshold<second threshold), and
   wherein if the packet loss rate is more than the first threshold, an extreme congestion is assumed, wherein if the packet loss rate is not more than the first threshold and the variation of the network jitter is more than the second threshold, a middle-level congestion is assumed, and wherein if the packet loss rate is not more than the first threshold and the variation of the network jitter is not more than the second threshold and the packet loss rate is not more than a third threshold (third threshold<first threshold) or the variation of the network jitter is not more than a fourth threshold (fourth threshold<second threshold), a case where the congestion is being eliminated or has been eliminated is assumed, then increase of the transmission bit rate is instructed.

7. A video information transmission apparatus for transmitting compressed video data, comprising:
transmission means for packetizing the compressed video data in units of frames or in small area encoding units, and transmitting the packetized compressed video data; and
transmission control means for controlling transmission of the transmission means using congestion information on a networks,
wherein the congestion information on the network includes at least a network jitter and a packet loss rate, and is categorized into a plurality of congestion levels by a queue overflow detection processing performed on a network gateway based on the packet loss rate, and by a propagation delay increase detection processing by a threshold processing conducted to a variation of the network jitter, whereby a congestion state of the network is determined,
wherein a determination result of the congestion state of the network is used to control transmission while avoiding congestion by changing the transmission bit rate according to the determination result,
wherein increase of the transmission bit rate is instructed only if the variation of the network jitter is not more than a first threshold and the packet loss rate is not more than a second threshold, and the variation of the network jitter is not more than a third threshold (third threshold<first threshold) or the packet loss rate is not more than a fourth threshold (fourth threshold<second threshold), and
wherein if the packet loss rate is more than the first threshold, an extreme congestion is assumed, wherein if the packet loss rate is not more than the first threshold and the variation of the network jitter is more than the second threshold, a middle-level congestion is assumed, and wherein if the packet loss rate is not more than the first threshold and the variation of the network jitter is not more than the second threshold and the packet loss rate is not more than a third threshold (third threshold<first threshold) or the variation of the network jitter is not more than a fourth threshold (fourth threshold<second threshold), a case where the congestion is being eliminated or has been eliminated is assumed, then increase of the transmission bit rate is instructed.

8. The video information transmission apparatus according to claim 7, wherein the congestion information on the network is input from an outside of the transmission control means through the network.

9. The video information transmission system according to claim 7, wherein the transmission control means controls the transmission by temporarily changing a transmission bit rate.

10. The video information transmission apparatus according to claim 7, wherein the packet loss rate is measured at certain time intervals.

11. The video information transmission apparatus according to claim 7, wherein the packet loss rate is measured at intervals of time since start of transmission until present time.

12. The video information transmission apparatus according to claim 7, wherein the determination result of the congestion state of the network includes a degree of the packet loss rate and the degree of the packet loss rate is used to adjust a decrease width of the transmission bit rate according to the degree of the packet loss rate.

13. The video information transmission apparatus according to claim 7, wherein the determination result of the congestion state of the network includes a degree of the variation of the network jitter and the degree of the variation of the network jitter is used to adjust a decrease width of the transmission bit rate according to the degree of the variation of the network jitter.

14. The video information transmission apparatus according to claim 7, wherein increase of the transmission bit rate is instructed and the transmission bit rate is controlled to be stable only after certain time passes since the transmission bit rate is previously decreased.

15. A video information transmission apparatus for receiving compressed video data, comprising:
congestion information acquisition means for acquiring the congestion information on the network from received packets of the video data; and
congestion information transmission means for transmitting the congestion information on the network to a sender side,
wherein the congestion information on the network includes at least a network jitter and a packet loss rate, and is categorized into a plurality of congestion levels by a queue overflow detection processing performed on a network gateway based on the packet loss rate, and by a propagation delay increase detection processing by a threshold processing conducted to a variation of the network jitter, whereby a congestion state of the network is determined,
wherein a determination result of the congestion state of the network is used to control transmission while avoiding congestion by changing the transmission bit rate according to the determination result,
wherein increase of the transmission bit rate is instructed only if the variation of the network jitter is not more than a first threshold and the packet loss rate is not more than a second threshold, and the variation of the network jitter is not more than a third threshold (third threshold<first threshold) or the packet loss rate is not more than a fourth threshold (fourth threshold<second threshold), and
wherein if the packet loss rate is more than the first threshold, an extreme congestion is assumed, wherein if the packet loss rate is not more than the first threshold and the variation of the network jitter is more than the second threshold, a middle-level congestion is assumed, and wherein if the packet loss rate is not more than the first threshold and the variation of the network jitter is not more than the second threshold and the packet loss rate is not more than a third threshold (third threshold<first threshold) or the variation of the network jitter is not more than a fourth threshold (fourth threshold<second threshold), a case where the congestion is being eliminated or has been eliminated is assumed, then increase of the transmission bit rate is instructed.

16. The video information transmission apparatus according to claim 15, wherein the congestion information transmission means transmits the congestion information on the network using RTCP (RTP Control Protocol) described in RFC1889.

17. The video information transmission apparatus according to claim 15, wherein the packet loss rate is measured at certain time intervals.

18. The video information transmission apparatus according to claim 15, wherein the packet loss rate is measured at intervals of time since start of reception until present time.

19. The video information transmission apparatus according to claim 15, wherein the determination result of the congestion state of the network includes a degree of the packet loss rate and the degree of the packet loss rate is used to adjust a decrease width of the transmission bit rate according to the degree of the packet loss rate.

20. The video information transmission apparatus according to claim 15, wherein the determination result of the congestion state of the network includes a degree of the variation of the network jitter and the degree of the variation of the network jitter is used to adjust a decrease width of the transmission bit rate according to the degree of the variation of the network jitter.

21. The video information transmission apparatus according to claim 15, wherein increase of the transmission bit rate is instructed and the transmission bit rate is controlled to be stable only after certain time passes since the transmission bit rate is previously decreased.

22. A video information transmission apparatus for transmitting compressed video data, comprising:
   transmission means for packetizing the compressed video data in units of frames or in small area encoding units, and transmitting the packetized compressed video data; and
   transmission control means for controlling a transmission bit rate of the transmission means in accordance with a transmission bit rate input from an outside of the transmission control means through a networks,
   wherein the transmission bit rate is obtained based on congestion information on the network,
   wherein the congestion information on the network includes at least a network jitter and a packet loss rate, and is categorized into a plurality of congestion levels by a queue overflow detection processing performed on a network gateway based on the packet loss rate, and by a propagation delay increase detection processing by a threshold processing conducted to a variation of the network jitter, whereby a congestion state of the network is determined,
   wherein a determination result of the congestion state of the network is used to control transmission while avoiding congestion by changing the transmission bit rate according to the determination result,
   wherein increase of the transmission bit rate is instructed only if the variation of the network jitter is not more than a first threshold and the packet loss rate is not more than a second threshold, and the variation of the network jitter is not more than a third threshold (third threshold<first threshold) or the packet loss rate is not more than a fourth threshold (fourth threshold<second threshold), and
   wherein if the packet loss rate is more than the first threshold, an extreme congestion is assumed, wherein if the packet loss rate is not more than the first threshold and the variation of the network jitter is more than the second threshold, a middle-level congestion is assumed, and wherein if the packet loss rate is not more than the first threshold and the variation of the network jitter is not more than the second threshold and the packet loss rate is not more than a third threshold (third threshold<first threshold) or the variation of the network jitter is not more than a fourth threshold (fourth threshold<second threshold), a case where the congestion is being eliminated or has been eliminated is assumed, then increase of the transmission bit rate is instructed.

23. A video information transmission apparatus for receiving compressed video data, comprising:
   congestion information acquisition means for acquiring congestion information on a network from received packets of the video data;
   transmission bit rate decision means for deciding a transmission bit rate using the congestion information on the network acquired by the congestion information acquisition means; and
   transmission bit rate transmission means for transmitting the transmission bit rate decided by the transmission bit rate decision means to a sender side,
   wherein the congestion information on the network includes at least a network jitter and a packet loss rate, and is categorized into a plurality of congestion levels by a queue overflow detection processing performed on a network gateway based on the packet loss rate, and by a propagation delay increase detection processing by a threshold processing conducted to a variation of the network jitter, whereby a congestion state of the network is determined,
   wherein a determination result of the congestion state of the network is used to control transmission while avoiding congestion by changing the transmission bit rate according to the determination result,
   wherein increase of the transmission bit rate is instructed only if the variation of the network jitter is not more than a first threshold and the packet loss rate is not more than a second threshold, and the variation of the network jitter is not more than a third threshold (third threshold<first threshold) or the packet loss rate is not more than a fourth threshold (fourth threshold<second threshold), and
   wherein if the packet loss rate is more than the first threshold, an extreme congestion is assumed, wherein if the packet loss rate is not more than the first threshold and the variation of the network jitter is more than the second threshold, a middle-level congestion is assumed, and wherein if the packet loss rate is not more than the first threshold and the variation of the network jitter is not more than the second threshold and the packet loss rate is not more than a third threshold (third threshold<first threshold) or the variation of the network jitter is not more than a fourth threshold (fourth threshold<second threshold), a case where the congestion is being eliminated or has been eliminated is assumed, then increase of the transmission bit rate is instructed.

24. A program allowing a computer to execute the following S1 to S4 procedures for each transmission control timing for receiving a control signal in a video information transmission system for transmitting compressed video data:
   S1: a procedure for comparing input congestion information on a network with a threshold, and determining whether extreme congestion occurs to at least the network, slight congestion occurs to at least the network, extremely slight congestion occurs and the congestion is being eliminated or has been eliminated;
   S2: a procedure for decreasing a transmission bit rate by a first proportion if it is determined that the extreme congestion occurs to the network;
   S3: a procedure for decreasing the transmission bit rate by a second proportion if it is determined that the slight congestion occurs to the network; and S4: a procedure for increasing the transmission bit rate by a third proportion if it is determined that the congestion is extremely slight and the congestion is being eliminated or has been eliminated, wherein the congestion information on the network includes at least a network jitter and a packet loss rate, and is categorized into a plurality of congestion levels by a queue overflow detection processing performed on a network gateway based on the packet loss rate, and by a propagation delay increase detection processing by a threshold processing conducted to a variation of the network jitter, whereby a congestion state of the network is determined, wherein a determination result of the congestion state of the network is used to control transmission while avoiding congestion by changing the transmission bit rate according to the determination result, and wherein if the packet loss rate is more than the first threshold, an extreme congestion is assumed, wherein if the packet loss rate is not more than the first threshold and the variation of the network jitter is more than the second threshold, a middle-level congestion is assumed, wherein if the packet loss rate is not more than the first threshold and the variation of the network jitter is more than the fifth threshold (fifth threshold<second threshold) and the variation of the network jitter is not more than the second threshold, a slight congestion is assumed, and wherein if the packet loss rate is not more than the first threshold and the variation of the network jitter is not more than the fifth threshold and the packet loss rate is not more than a third threshold (third threshold<first threshold) or the variation of the network jitter is not more than a fourth threshold (fourth threshold<fifth threshold), a case where the congestion is extremely slight and the congestion is being eliminated or has been eliminated is assumed.

* * * * *